United States Patent
Corriston et al.

[15] 3,682,502
[45] Aug. 8, 1972

[54] PIPE COUPLING

[72] Inventors: Winfield F. Corriston, Far Hills; Robert W. Heisler, Somerville, both of N.J.

[73] Assignee: Johns-Manville Corporation, New York, N.Y.

[22] Filed: June 29, 1970

[21] Appl. No.: 50,627

[52] U.S. Cl. ................. 285/235, 138/119, 285/423
[51] Int. Cl. .............................................. F16l 21/00
[58] Field of Search ...... 285/364, 383, 417, 423, 260, 285/235; 138/119

[56] References Cited

UNITED STATES PATENTS

| 3,212,799 | 10/1965 | Rice | 285/423 X |
| 3,368,830 | 2/1968 | French | 285/423 X |
| 3,508,587 | 4/1970 | Mouch | 138/119 |
| 3,177,015 | 4/1965 | Brown | 285/383 X |

FOREIGN PATENTS OR APPLICATIONS

| 1,146,169 | 3/1969 | Great Britain | 285/423 |
| 1,326,856 | 4/1963 | France | 285/423 |

Primary Examiner—Dave W. Arola
Attorney—John A. McKinney and Robert M. Krone

[57] ABSTRACT

This invention relates to a pipe coupling for joining the ends of two sections of pipe in axial communication. The coupling is defined by a thin walled flexible tubular sleeve having peripherally spaced apart generally inflexible internal abutments for positioning the pipes relative to the coupling but permitting the sleeve to be collapsed upon itself for ease of handling and transporting.

3 Claims, 6 Drawing Figures

PATENTED AUG 8 1972

3,682,502

INVENTORS,
WINFIELD F. CORRISTON,
ROBERT W. HEISLER

BY John R. McKinney
ATTORNEY

PIPE COUPLING

BACKGROUND OF THE INVENTION

In the pipe coupling of U.S. Pat. No. 3,212,799, a cylindrical sleeve having flared ends is formed of semi-elastic material and is adapted for joining ends of pipe sections in generally axial communication. It includes a continuous internal annular rib or abutment 2 for providing automatic end separation of the pipes. While the coupling disclosed in U.S. Pat. No. 3,212,799 is formed of a semi-elastic sheet-like material which is somewhat flexible, it resists collapse in a direction transverse to annular rib 2 by reason of the cross-sectional configuration. Thus, handling and shipping costs are high because the couplings cannot be folded to conserve space. For background purposes attention is invited to another pipe joint as disclosed in U.S. Pat. No. 3,368,830 wherein a continuous internal rib 4 is employed for centering and abutment means.

The present invention is concerned with an improvement wherein the abutment means, instead of being annular and continuous, are intermittent so as to permit the sleeve to be folded in a direction parallel to its longitudinal extent.

SUMMARY OF THE INVENTION

An object of this invention is to provide a sleeve-like flexible pipe coupling having internal axial abutments which are peripherally spaced apart to allow the sleeve to be at least partially collapsed for ease of handling, packaging, and shipping.

BRIEF DESCRIPTION OF THE DRAWINGS

The invention will be more fully understood and further objects and advantages thereof will become apparent when reference is made to the following detailed description of the preferred embodiment of the invention and the accompanying drawings in which.

DESCRIPTION OF THE PREFERRED EMBODIMENT

Figure 1:
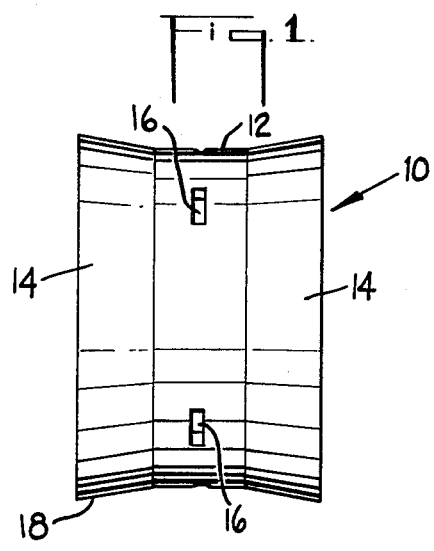
FIG. 1 is a side view of the pipe coupling.
Figure 2:
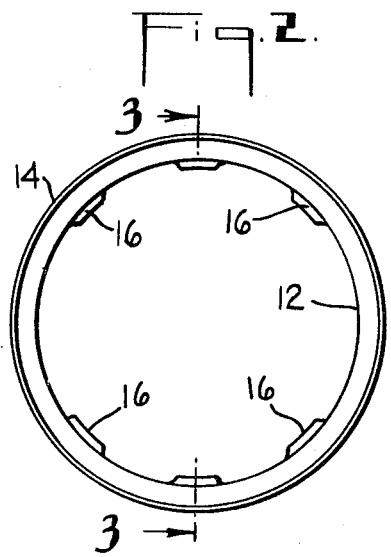
FIG. 2 is an end view of the pipe coupling.
Figure 4:
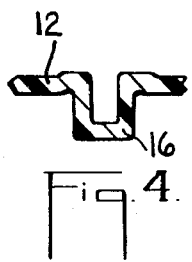
FIG. 4 is an enlarged cross-sectional view of one of the internal abutment means.

The coupling herein is for joining ends of pipe sections in axial communication, and may be used to advantage in connecting sections of asbestos-cement pipe. The coupling is economical to manufacture and install in installations where generally low pressures are involved, as for example in drainage pipe. Referring to FIG. 1, there is illustrated a side elevation of the coupling 10 which is generally in the form of a cylindrical sleeve. The coupling includes an intermediate cylindrical portion 12 and bell or flared portions 14 at opposite ends thereof. The material from which the coupling 10 is formed comprises a semi-elastic ethylene-vinyl acetate copolymer having a relatively thin wall in the range of about one-sixteenth to three-sixteenth inch depending upon physical pipe size. While the coupling is semi-elastic, it has sufficient body so that it assumes a cylindrical shape when at rest. The material is flexible or slightly stretchable to force applied thereto but upon release will return to its natural shape. FIG. 2 represents an end view of the coupling and shows about the inner periphery of portion 12 a plurality of spaced apart inwardly projecting ribs or abutments 16. These abutments by their cross-sectional shape, lend a degree of rigidity to the sleeve cylindrical portion 12, but do not interfere with flexibility of wall portions therebetween. As shown in FIGS. 1 and 4, the abutments are formed integrally with the wall and project inwardly.

Figure 3:
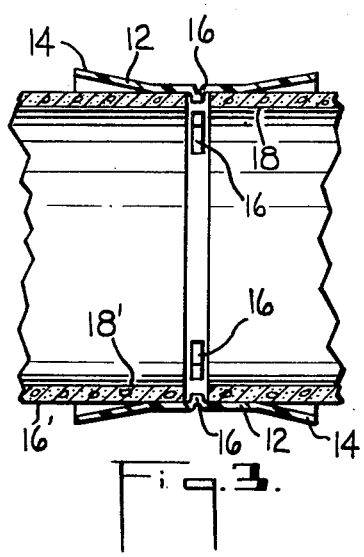
FIG. 3 is a cross-sectional view of the pipe coupling taken generally along line 3—3 of FIG. 2 and additionally showing coupled pipe ends in cross-section.

FIG. 3, which is a cross-sectional view of the coupling, also shows a sectional view of pipe ends 18, 18' which are coupled in aligned communication. As can be seen in this arrangement, the flared ends 14 (shown exaggerated for illustration) are for guiding each end 18, 18' of the pipes into aligned position. The flared portions at their extremities are normally somewhat larger in internal diameter than the external diameter of the pipe. The flared portions taper inwardly to the cylindrical portion 12 which is normally slightly smaller in diameter than the outside diameter of the pipe ends. When the pipes are coupled as shown in FIG. 3, there will be established a tight fit between the coupling and pipe ends 18, 18' by reason of the required stretching of the cylindrical portion 12 of the coupling.

Abutments 16 are shown in FIG. 3 in abutting relationship with each pipe end so as to position the coupling equally onto each pipe. The fact that the ribs are spaced apart, and not continuous, about the inner periphery of portion 12 does not interfere with their function of determining the extent of axial reception of each pipe end. By spacing the abutments, as shown, portions of wall 12 therebetween are undeformed and therefore remain relatively flexible.

A typical cross-sectional view of an internally directed abutment 16 is shown in FIG. 4. It is formed integrally with the wall of portion 12, and is relatively rigid primarily by reason of its small size and shape.

Figure 6:
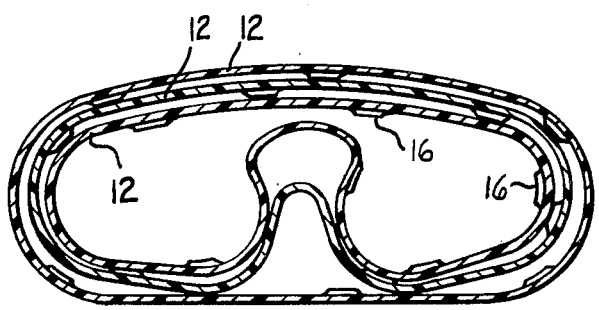
FIG. 6 shows a plurality of the couplings in cross-section with some at least partially collapsed for storage one within the other.
Figure 5:
FIG. 5 shows the sleeve coupling collapsed.

In FIG. 5, a cross-sectional view through portion 12, it is shown that the coupling may be folded about opposed portions between ribs 16 and essentially collapsed upon itself along a longitudinal plane. In FIG. 6 a different fold is shown wherein couplings of essentially the same size are fitted one within the other. In either showing the cylindrical sleeve defining the coupling is adapted to be folded at its walls without interference from internal ribs 16. The wall material being somewhat resilient returns to its original cylindrical shape when released. In the disclosures of the patents previously mentioned, where the rib extends internally completely about the inner periphery, folding is not possible to the extent obtainable herein without permanent deformation or rupture of the rib portion of the coupling.

The wall sections of cylindrical portion 12 between ribs 16 may be considered, by reason of their flexibility, as defining hinge means permitting folding to at least partially collapse the sleeve. As will be appreciated by the illustrations of FIGS. 5 and 6, a substantial space advantage is obtained by folding the coupling for handling and shipping. By interrupting the internal abutment the folding advantage is obtained, yet abutment means remain for controlling the axial extent of assembly of the coupling on the pipe.

We claim:

1. A pipe coupling for joining pipe ends in axial communication comprising:

a sleeve formed of relatively thin walled semi-elastic material adapted to receive pipe ends therein from opposite directions, said sleeve having an intermediate portion of an internal diameter less than external diameters of pipe ends the sleeve is adapted to receive to assure a tight fit between pipe ends and the sleeve, and said sleeve having flared terminal portions, each terminal portion having an internal diameter at its outermost end greater than said internal diameter of said intermediate portion to facilitate entry of pipe ends into the sleeve; said intermediate and terminal portions having uninterrupted internal surfaces means internal of the sleeve and intermediate the terminal portions thereof defining axial abutments for contact with pipe ends to limit the entry of pipe ends into the sleeve; and said abutment means being circumferentially spaced apart about the inner periphery of the sleeve wall and being relatively inflexible whereby the semi-elastic sleeve wall between adjacent abutments may act as hinges thereby permitting the sleeve to be at least partially collapsed upon itself.

2. The claimed subject matter of claim 1 wherein the abutment means is integrally formed with the sleeve wall.

3. The claimed subject matter of claim 2 wherein the integrally formed abutment means are of a shape for establishing their relative inflexibility.

* * * * *